United States Patent

Ghias et al.

[11] Patent Number: 5,874,686
[45] Date of Patent: Feb. 23, 1999

[54] APPARATUS AND METHOD FOR SEARCHING A MELODY

[76] Inventors: Asif U. Ghias, 2306 Sultana Dr., Yorktown Heights, N.Y. 10598; Jonathan A. Logan, 1186 Palomino Rd., Santa Barbara, Calif. 93105; David W. Chamberlin, 206 Flynn Ave., Mountain View, Calif. 94043

[21] Appl. No.: 742,260

[22] Filed: Oct. 31, 1996

Related U.S. Application Data

[60] Provisional application No. 60/008,177, Oct. 31, 1995.

[51] Int. Cl.⁶ .............................. A63H 5/00; G04B 13/00; G10H 7/00
[52] U.S. Cl. .............................................. 84/609; 84/616
[58] Field of Search .............................. 84/600, 609, 634, 84/616, 654

[56] References Cited

U.S. PATENT DOCUMENTS

| | | |
|---|---|---|
| 4,688,464 | 8/1987 | Gibson et al. . |
| 4,771,671 | 9/1988 | Hoff, Jr. ..................................... 84/645 |
| 5,038,658 | 8/1991 | Tsuruta et al. . |
| 5,088,380 | 2/1992 | Minamitaka .............................. 84/637 |
| 5,402,339 | 3/1995 | Nakashima et al. . |
| 5,510,572 | 4/1996 | Hayashi et al. ........................... 84/609 |
| 5,619,004 | 4/1997 | Dame . |

FOREIGN PATENT DOCUMENTS 405061917A 3/1993 Japan .

OTHER PUBLICATIONS

Hawley, Michael J., Structure out of Sound, 1993, MIT Doctoral Thesis, Abstract.

*Primary Examiner*—William M. Shoop, Jr.
*Assistant Examiner*—Jeffrey W. Donels
*Attorney, Agent, or Firm*—Hodgson, Russ, Andrews, Woods & Goodyear LLP

[57] ABSTRACT

Apparatus and method for easily, efficiently, and accurately searching melodies. A melody is inputted to a computer and converted into a form of a sequence of digitized representations of relative pitch differences between successive notes thereof. A melody database is searched for at least one sequence of digitized representations of relative pitch differences between successive notes which at least approximately matches the sequence of digitized representations of relative pitch differences between successive notes of the melody.

16 Claims, 3 Drawing Sheets

5,874,686

APPARATUS AND METHOD FOR SEARCHING A MELODY

CROSS REFERENCE TO A RELATED APPLICATION

This application claims priority of provisional application Ser. No. 60/008,177, filed Oct. 31, 1995, which is hereby incorporated herein by reference.

BACKGROUND OF THE INVENTION

The present invention relates generally to database searching. More particularly, the present invention relates to melody searching.

Next generation databases should include image, audio, and video data in addition to traditional text and numerical data. These data types will require query methods that are more appropriate and natural to the type of respective data. For instance, a natural way to query an image database is to retrieve images based on operations on images or sketches supplied as input. Similarly, a natural way of querying an audio database (of songs) is to hum the tune of a song, as apparently addressed in T. Kageyama and Y. Takashima, "A Melody Retrieval Method With Hummed Melody" (language: Japanese), *Transactions of the Institute of Electronics, Information and Communication Engineers D-II*, J77D-II(8): 1543–1551, August 1994. Such a system would be useful in any multimedia database containing musical data by providing an alternative and natural way of querying. One can also imagine a widespread use of such a system in commercial music industry, music radio and TV stations, music stores, and even for one's personal use.

It has been observed that melodic contour, defined as the sequence of relative differences in pitch between successive notes, can be used to discriminate between melodies. See Stephen Handel, *Listening: An Introduction to the Perception of Auditory Events*, The MIT Press, 1989, which indicates that melodic contour is one of the most important methods that listeners use to determine similarities between melodies. In Michael Jerome Hawley, *Structure out of Sound*, PhD thesis, MIT, September 1993, a method of querying a collection of melodic themes by searching for exact matches of sequences of relative pitches input by a MIDI keyboard is briefly discussed.

U.S. Pat. No. 5,510,572 discloses utilizing pitch differences between successive notes in classifying motion for a melody analyzer and harmonizer, wherein a search may be incidentally used to find an appropriate chord progression to, for example, harmonize music so as to accompany a singer. Other art which may be of interest includes U.S. Pat. Nos. 5,040,081; 5,146,833; 5,140,886; 4,688,464, and 5,418,322.

SUMMARY OF THE INVENTION

It is an object of the present invention to easily, efficiently, and accurately search melodies.

In order to easily, efficiently, and accurately search melodies, in accordance with the present invention, a computer means is provided which has a database of melodies each including a plurality of notes in a form of a sequence of digitized representations of relative pitch differences between successive notes, a melody is inputted to the computer means and converted into a form of a sequence of digitized representations of relative pitch differences between successive notes thereof, and the melody database is searched for at least one sequence of digitized representations of relative pitch differences between successive notes which at least approximately matches the sequence of digitized representations of relative pitch differences between successive notes of the melody.

The above and other objects, features, and advantages of the present invention will be apparent in the following detailed description of a preferred embodiment thereof when read in conjunction with the accompanying drawings wherein the same reference numerals denote the same or similar parts throughout the several views.

DETAILED DESCRIPTION OF THE PREFERRED EMBODIMENT

Figure 1:
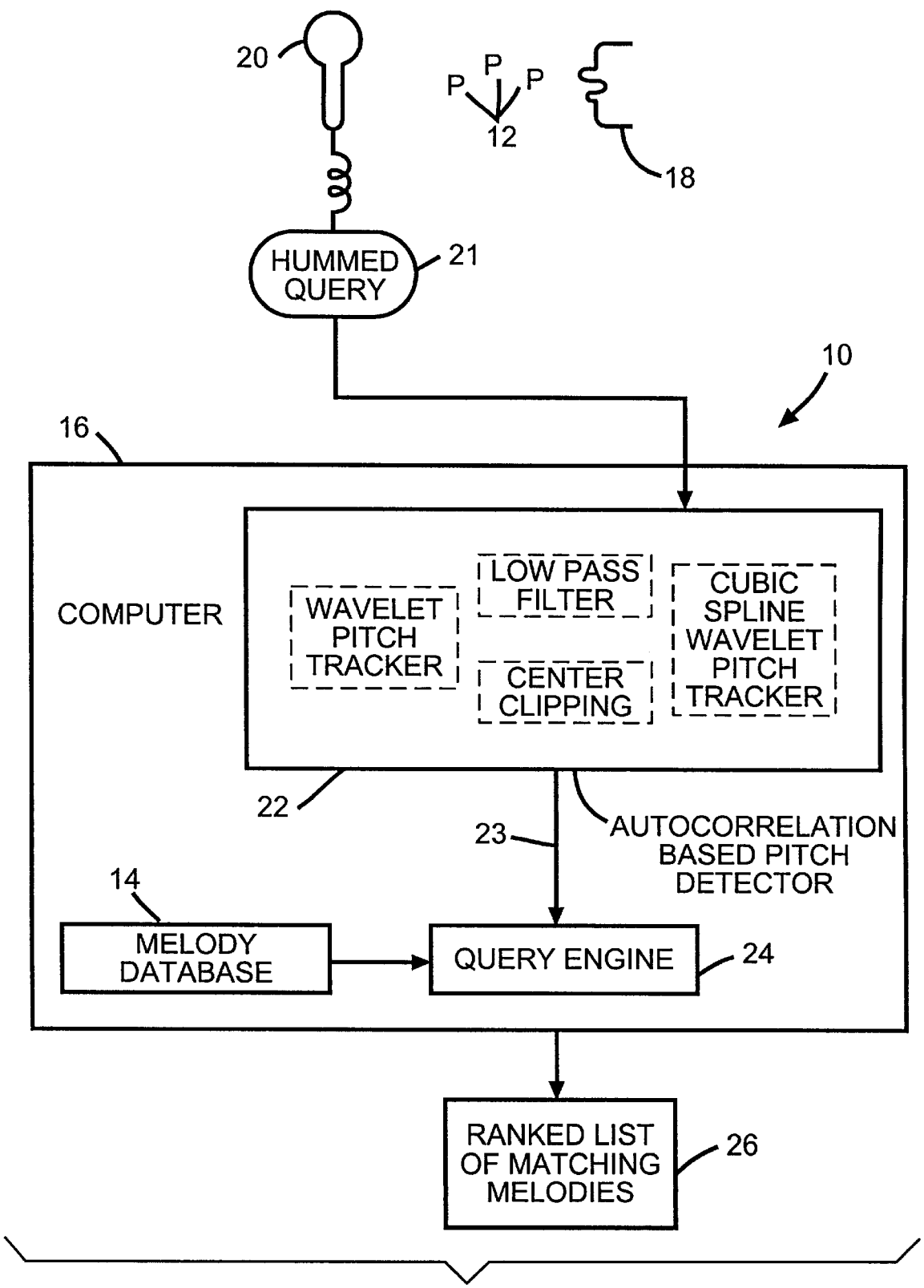
FIG. 1 is a block diagram illustrating an apparatus and method which embodies the present invention.

Referring to FIG. 1, there is illustrated generally at 10 apparatus for searching a melody, which is represented by a series of successive notes, illustrated at 12, which of course have different pitches. In other words, it may be desirable to know the identity of the particular melody or tune 12, and a database, illustrated at 14, of melodies or tunes is searched, as described hereinafter, to locate at least one melody or tune which at least approximately matches the tune 12. The database 14 is shown to be contained within a general purpose computer 16, but, alternatively, the database 14 may be located apart from the computer 16 and suitably connected thereto for communicating between the computer and database. Both of these alternatives are meant to come within the scope of the present invention.

In accordance with the present invention, the tune 12 is hummed by a person 18 into a microphone 20, and the hummed query, illustrated at 21, is suitably digitized, in accordance with principles commonly known to those of ordinary skill in the art to which this invention pertains, and the digitized signals of the hummed query 21 are fed to a pitch tracking module 22 in computer 16. The pitch tracker assembles a contour representation of the hummed melody 12, as hereinafter discussed in greater detail, which is fed to a query engine, illustrated at 24. The query engine 24 searches the melody database 14 and outputs a ranked list of approximately matching melodies, as illustrated at 26. A preselected error tolerance may be applied to the search. The query engine 24 may of course alternatively be programmed to output the single most approximate matching melody or, if desired, to output an exact matching melody. However, by searching for an approximate matching melody, as hereinafter discussed, various forms of anticipated errors may be taken into account.

The database 14 of melodies may be acquired, for example, by processing public domain MIDI songs, or may otherwise be suitably acquired, and may be stored as a flat-file database. Pitch tracking may be performed in, for example, Matlab software, a product of the Matworks, Inc. of Natick, Mass., chosen for its built-in audio processing capabilities and the east of testing a number of algorithms within it. Hummed queries may be recorded in a variety of formats, depending upon the platform-specific audio input capabilities of the Matlab software. For example, the format may be a 16-bit, 44 Khz WAV format on a Pentium system, or a 8-bit 8 Khz AU format on a Sun Sparcstation. The query engine 24 may use an approximate pattern matching algorithm, described hereinafter, in order to tolerate humming errors.

User input 12 (humming) to the system 10 is converted into a sequence of relative pitch transitions, as follows. A note 12 in the input may be classified in one of three ways: a note is either the same as the previous note (S), higher than the previous note (U), or lower than the previous note (D). Thus, the input is converted into a string with a three letter alphabet (U,D,S). For example, the introductory theme of Beethoven's 5th Symphony would be converted into the sequence: — S S D U S S D (the first note is ignored as it has no previous pitch). For another example, the melody portion 12, as illustrated in FIG. 1 with one high note between two lower notes, would be converted into the sequence: U D.

To accomplish this conversion, a sequence of pitches in the melody must be isolated and tracked. This is not as straight-forward as it sounds, however, as there is still considerable controversy over exactly what pitch is. The general concept of pitch is clear: given a note, the pitch is the frequency that most closely matches what one hears. Performing this conversion in a computer can become troublesome because some intricacies of human hearing are still not clearly understood. For instance, if one plays the 4th, 5th, and 6th harmonics of some fundamental frequency, one actually hears the fundamental frequency, not the harmonics, even though the fundamental frequency is not present. This phenomenon was first discovered by Schouten in some pioneer investigations carried out from 1938 to 1940. Schouten studied the pitch of periodic sound waves produced by an optical siren in which the fundamental of 200 Hz was cancelled completely. The pitch of the complex tone, however, was the same as that prior to the elimination of the fundamental. See R. Plomp, *Aspects of Tone Sensation*, Academic Press, London, 1976.

Because of the interest in tracking pitch in humming, methods were examined for automatically tracking pitch in a human voice. Before one can estimate the pitch of an acoustic signal, we must first understand how this signal is created, which requires forming a model of sound production at the source. The vibrations of the vocal cords in voiced sounds are caused as a consequence of forces that are exerted on the laryngeal walls when air flows through the glottis (the gap between the vocal cords). The terms "vocal folds" and "vocal cords" are more or less used as synonyms in the literature. Wolfgang Hess, *Pitch Determination of Speech Signals*, Springer-Verlag, Berlin Heidelberg, 1983, describes a model of the vocal cords as proposed by M. Hirano, "Structure and Vibratory Behavior of the Vocal Folds," in M. Sawashima and F. S. Cooper, editors, *Dynamic aspects of speech production*, pages 13–27, University of Tokyo Press, 1976. For the purposes of the present application though, it is sufficient to know that the glottis repeatedly opens and closes thus providing bursts of air through the vocal tract.

The vocal tract can be modeled as a linear passive transmission system with a transfer function H(z). If one adds an additional transfer function R(z) which takes into account the radiation, the output impedance of the vocal tract can approximately be set to zero. In the neutral position where the vocal tract can be regarded as a uniform tube, the resonances of the vocal tract occur at sound wavelengths of $$\lambda = \frac{4L}{(2k-1)c} \quad ; \quad k = 1, 2, 3, \ldots$$

With L–17 cm (average value of vocal-tract length) and a sound propagation speed of c=340 meters/sec., the frequencies of these resonances will be:

$$F_k = (2k-1) \cdot 500 \text{ Hz}; \ k=1,2,3,\ldots$$

The frequencies $F_k$ are called formant frequencies.

Figure 2:
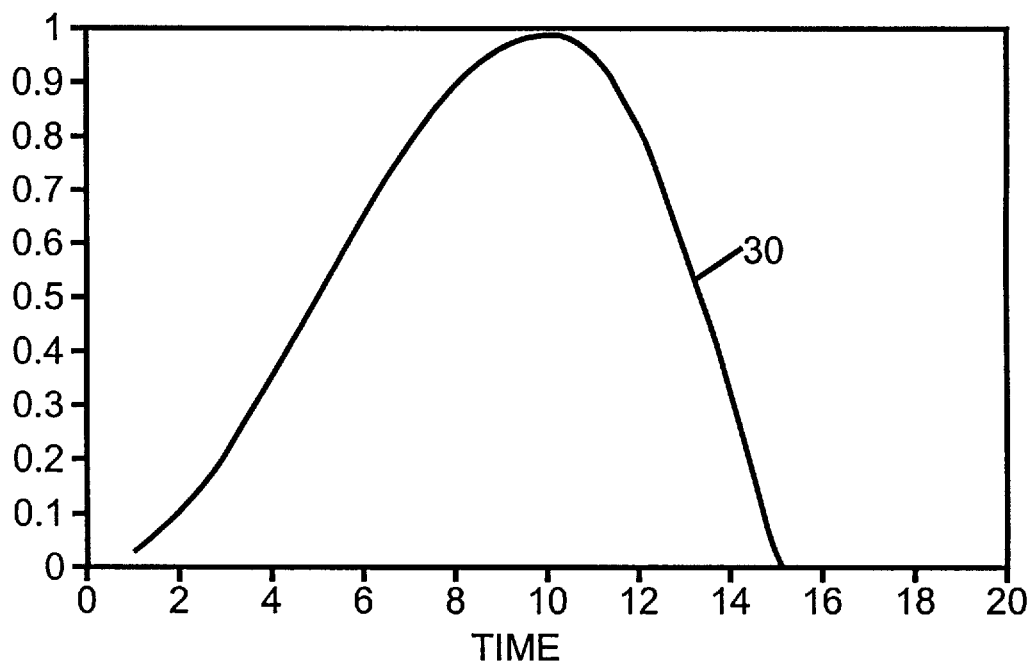
FIGS. 2 and 3 are graphs illustrating an excitation signal and train of such excitation signals respectively used to create a synthesized pitch for the method and apparatus.
Figure 3:
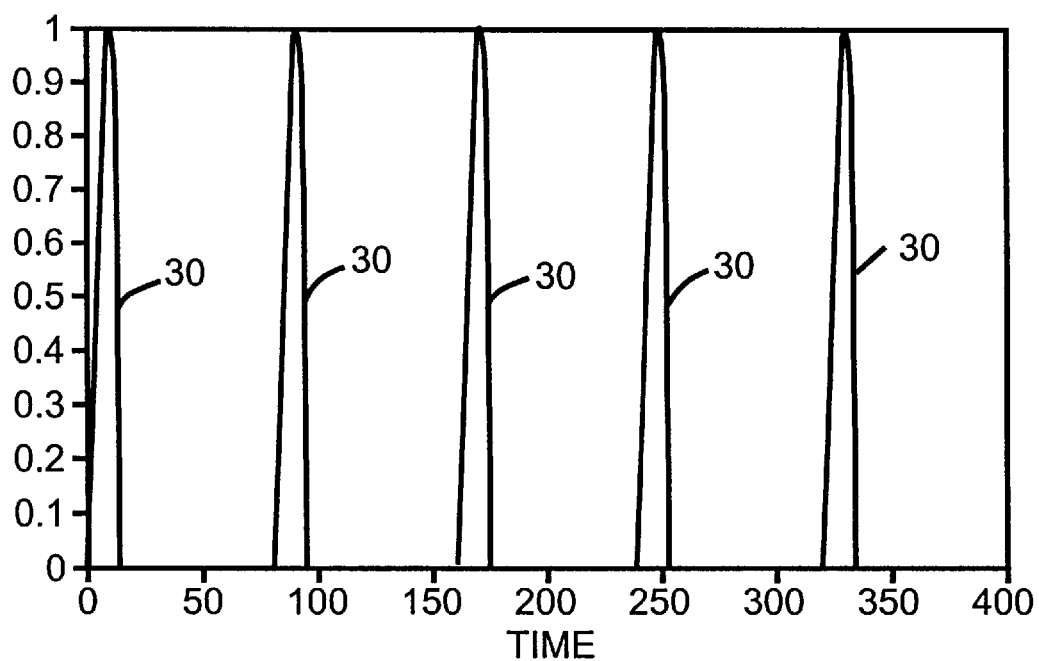
Figure 4:
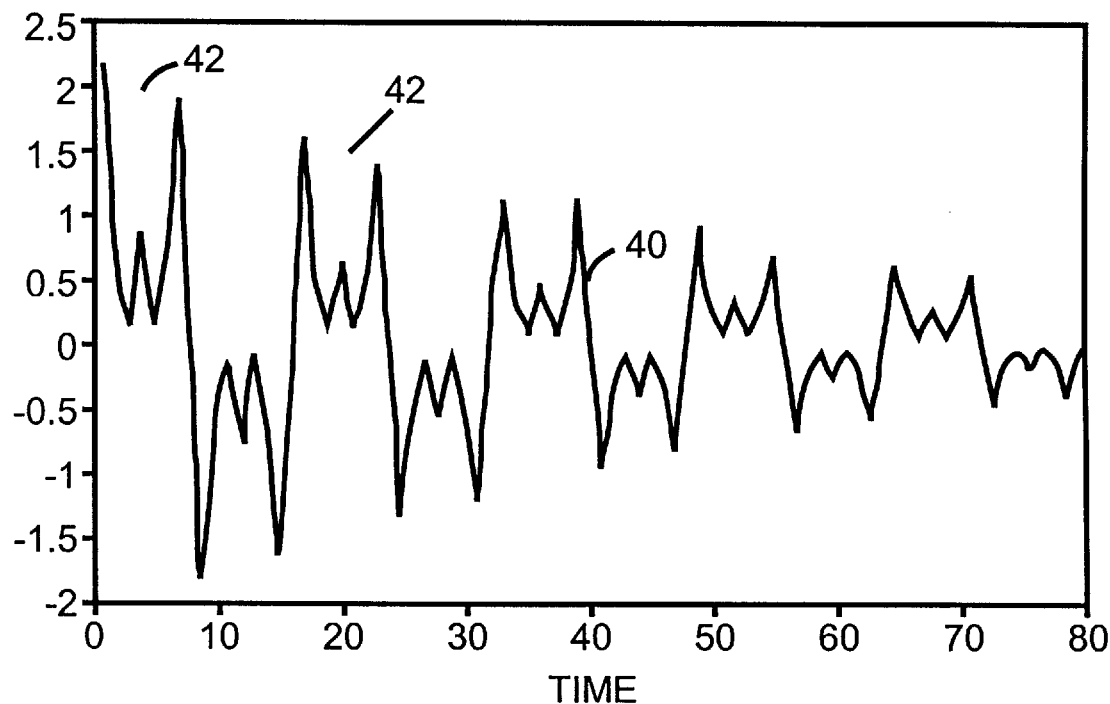
FIG. 4 is a graph of a formant structure which is formed from certain formant frequencies.
Figure 5:
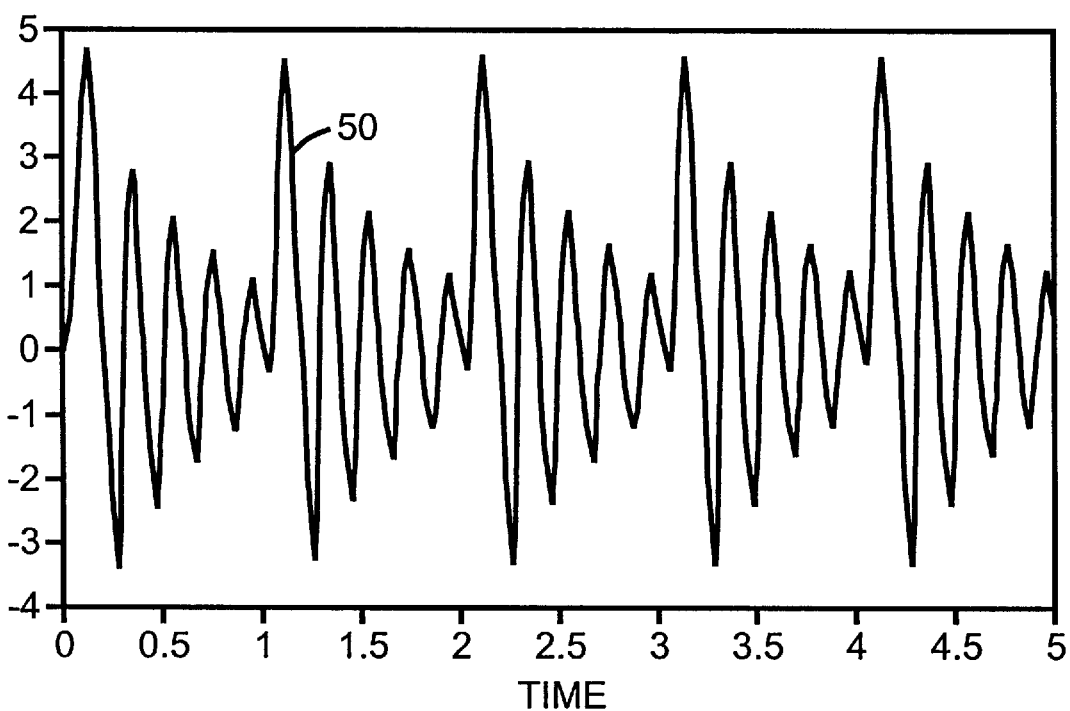
FIG. 5 is a graph of a synthesized pitch created by convolving the train of excitation pulses of FIG. 3 and the formant structure of FIG. 4.

The resulting sound that is heard is considered to be the convolution of the excitation pulse, illustrated at 30 in FIG. 2, created by the glottis and the formant frequencies. Therefore, if one wants to model a speech signal, one starts with a train of excitation pulses 30, as shown in FIG. 3. The period $T_o$ in the train of excitations 30 is 0.01 sec. making the pitch 100 Hz. For the formant frequencies, the above equation for $F_k$ is used with k∈ {1,2,3}. This gives formant frequencies: $F_1$=500 Hz, $F_2$=1500 Hz, and $F_3$=2500 Hz. Combining these frequencies and adding an exponential envelope produces the formant structure shown at 40 in FIG. 4. By convolving the train of excitation pulses 30 with the formant structure 40 a synthesized pitch, as shown at 50 in FIG. 5, is obtained.

Since what one hears as pitch is considered to actually be the frequency at which the bursts of air occur, one may be able to find the pitch of the segment by tracking the bursts of air.

There are at least three approaches to tracking pitch.

The Maximum Likelihood approach, which is described by James D. Wise, James R. Caprio, and Thomas W. Parks in "Maximum Likelihood Pitch Estimation," *IEEE Trans. Acoust., Speech, Signal Processing*, 24(5): 418–423, October 1976, is a modification of autocorrelation (hereinafter discussed) that increases the accuracy of the pitch and decreases the chances of aliasing.

However, this approach is very slow due to its computational complexity. An implementation in Matlab software may typically take approximately one hour or longer to evaluate 10 seconds of audio on a 90 MHz Pentium workstation. With some optimizations, the performance may be improved to approximately 15 minutes per 10 seconds of audio, but this is still far too slow for the purposes of this invention.

The Cepstrum Analysis approach, which is discussed in A. V. Oppenheim, "A Speech Analysis-Synthesis System Based on Homomorphic Filtering," *J. Acoustical Society of America*, 45: 458–465, February 1969, and in Alan V. Oppenheim and Ronald W. Schafer, *Discretetime-Signal Processing*, Prentice Hall, Englewood Cliffs, N.J., 1989, does not give very accurate results for-humming.

In order to provide both rapid and accurate pitch tracking, a preferred pitch tracking approach is autocorrelation, which is described in L. R. Rabiner, J. J. Dubnowski, and R. W. Schafer, "Realtime Digital Hardware Pitch Detector," *IEEE Transactions on Acoustics, Speech and Signal Processing*, ASSP-24(1): 2–8, February 1976. This approach isolates and tracks the peak energy levels of the signal which is a measure of the pitch. Referring back to FIG. 4, the signal s(n), illustrated at 40, peaks where the impulses occur. Therefore, tracking the frequency of these peaks 42 should provide the pitch of the signal. In order to get the frequency of these peaks 42, autocorrelation is employed, which is defined by:

$$R(l) = \sum_{k=-\infty}^{\infty} h(k)h(l+k)$$

where l is the lag and h is the input signal.

While autocorrelation is subject to aliasing (picking an integer multiple of the actual pitch) and is computationally complex, it still provides greater speed and accuracy as compared to the previously discussed approaches. The present implementation of autocorrelation was found to require approximately 45 seconds for 10 seconds of 44 KHz, 16-bit audio on a 90 MHz pentium workstation.

In order to improve the performance and speed and robustness of the pitch-tracking algorithm, a cubic-spline wavelet transform or other suitable wavelet transform may be used. The cubic spline wavelet peaks at discontinuities in the signal (i.e., the air impulses). One of the most significant features of the wavelet analysis is that it can be implemented in a filter bank structure and therefore computed in O(n) time.

It is preferred that the cubic spline wavelet implementation be an event-based implementation of the tracer.

The cubic spline wavelet transform is linear and shift-invariant which are useful properties for speech signals since they are often modelled as a linear combination of shifted and damped sinusoids.

If a signal x(t) or its derivatives have discontinuities, then the modulus of the cubic spline transform of x(t) exhibits local maxima around the points of discontinuity. This is considered to be a desirable property for a cubic spline wavelet pitch-tracker since glottal closure causes sharp changes in the derivative of the air flow in the glottis and transients in the speech signal.

It has been shown in S. Mallat and W. L. Hwang, "Singularity Detection and Processing with Wavelets", Technical Report, Courant Institute of Mathematical Sciences, New York, March, 1991, that if one chooses a wavelet function g(t) that is the first derivative of a smoothing function (a smoothing function is a function whose Fourier transform has energy concentrated in the low-frequency region) P(t), then the local maxima of the transform indicate the sharp variations in the signal whereas the local minima indicate the slow variations. Hence, the local maxima of the transform using a wavelet, which is the first derivative of a smoothing function, is considered to be desirable for detecting the abrupt changes or transients in the speech signal caused by glottal closure.

One of the most appealing features of the cubic spline wavelet transform is that is can be implemented in a filter bank structure. It therefore is O(n) fast.

Preferably, the autocorrelation pitch tracking approach includes low-pass filtering (for removing non-vocal frequencies) and center-clipping, as described in M. M. Sondhi, "New Methods of Pitch Extraction," *IEEE Trans. Audio Electroacoust.* (*Special Issue on Speech Communication and Processing—Part II*), AU-16: 262–266, June 1968. It is considered that these will help eliminate the formant structure that generally causes difficulty for auto-correlation based pitch detectors.

This preferred form of autocorrelation takes between 20 and 45 seconds on a Sparc10 workstation to process typical sequences of hummed notes. A brute-force search of the database unsurprisingly shows linear growth with the size of the database, but remains below 4 seconds for 100 songs on a Sparc2. Therefore, the search time is currently effectively limited by the efficiency of the pitch-tracker.

In order to search the database, songs in the database 14 are preprocessed to convert the melody into a stream of the previously discussed U,D,S characters, and the converted user input (the key 23) is compared with all the songs.

The pattern-matching desirably uses a "fuzzy" search to allow for errors within the matches. These errors reflect the inaccuracies in the way people hum as well as errors in the representation of the songs themselves.

For performing the key-search within the database 14, it is considered desirable to use an efficient approximate pattern matching algorithm. By "approximate" is meant that the algorithm should be able to take into account various forms of errors.

Using the word CASABLANCA as an example, the following are examples of the types of errors which may occur in a typical pattern matching scheme.

|  | In CASABLANCA | In a melody |
|---|---|---|
| Transposition error | CASABALNCA | two notes reversed |
| Dropout error | CAS BLANCA | a note dropped |
| Duplication error | CASAABLANCA | a note duplicated |
| Insertion error | CASABTLANCA | a note inserted |

Several Algorithms have been developed that address the problem of approximate string matching. Running times have ranged from O(mn) for the brute force algorithm to O(kn) or O(nlog(m)), where "O" means "on the order of," m is the number of pitch differences in the query, and n is the size of the string (song). See Ricardo Baeza-Yates and G. H. Gonnet, "Fast String Matching with Mismatches," *Information and Computation,* 1992. A preferred algorithm which is considered to offer better performance in general for this purpose is that described in Ricardo A. Baesa-Yates and Chris H. Perieberg, "Fast and Practical Approximate String Matching, "*Combinatorial Pattern Matching, Third Annual Symposium,*" pages 185–192, 1992.

This algorithm addresses the problem of string matching with k mismatches. The problem consists of finding all instances of a pattern string P=p1,p2,p3 . . . pm in a text string T=t1,t2,t3 . . . tn such that there are at most k mismatches (characters that are not the same) for each instance of P in T. When k=0 (no mismatches) one has the simple string matching problem, solvable in O(n) time. When k=m, every substring of T of length m qualifies as a match, since every character of P can be mismatched. Each of the errors in the above CASABLANCA example corresponds to k=1.

The worst case for this algorithm occurs when P (the key 23) consists of m occurrences of a single distinct character, and T (contour representation of song) consists of n instances of that character. In this case the running time is O(mn). However, this is neither a common nor useful situation for the present invention. In the average case of an alphabet in which each character is equally likely to occur, the running time is $$O(n(1 + \frac{m}{|r|})$$

where |r| is the size of the alphabet.

The computer 16 may desirably be programmed so that, for a given query, the database 14 returns a list of songs ranked by how well they matched the query, not just one best match. The number of matches that the database 14 should retrieve depends upon the error-tolerance used during the key-search. This error-tolerance could be set in one of two possible ways: either it can be a user-definable parameter or the database can itself determine this parameter based on, for example, heuristics that depends on the length of the key. This would give the user an opportunity to perform queries even if the user is not sure of some notes within the tune.

From the results of the query the user can identify the song of interest. If the list is too large, the user can perform a new query on a restricted search list consisting of songs just retrieved. This allows the user to identify sets of songs that contain similar melodies.

An experimental evaluation of the system tested the tolerance of the system with respect to input errors, whether from mistakes in the user's humming or from problems with the pitch-tracking.

Effectiveness of the system 10 is directly related to the accuracy with which pitches that are hummed can be tracked and the accuracy of the melodic information within the database 14. Under ideal circumstances, one can achieve close to 100% accuracy tracking humming, where "ideal circumstances" means that the user places a small amount of space between each note and hits each note strongly. For this purpose, humming short notes is encouraged. Even more ideal is for the user to aspirate the notes as much as possible, perhaps going so far as to voice a vowel, as in "haaa haaa haaa." Only male voices have been experimented with.

The evaluation database contained a total of 183 songs. Each song was converted from public domain General MIDI sources. Melodies from different musical genres were included, including both classical and popular music. A few simple heuristics were used to cut down on the amount of irrelevant information from the data, e.g., MIDI channel 10 was ignored as this is reserved for percussion in the General MIDI standard. However, the database still contained a great deal of information unrelated to the main theme of the melody. Even with this limitation, it is discovered that sequences of 10 to 12 pitch transitions were sufficient to discriminate 90% of the songs.

As a consequence of using a fast approximate string matching algorithm, search keys can be matched with any portion of the melody, rather than just the beginning. As the size of the database grows larger, however, this may not prove to be an advantage.

Contour representations for each song are stored in separate files. Opening and closing files may become a significant overhead. Performance may therefore be improved by packing all the songs into one file, or by using a database manager. The programming code may be modernized to make it independent of any particular database schema.

The pattern matching algorithm in the form previously described does not discriminate between the various forms of pattern matching errors discussed earlier, but only accounts for them collectively. Some forms of errors may be more common than others depending upon the way people casually hum different tunes. For example, drop-out errors reflected as dropped notes in tunes are more common than transposition or duplication errors. Tuning the key-search so that it is more tolerant to drop-out errors, for example, may yield better results.

The generation of the melodic contours of the source songs automatically from MIDI data is convenient but not optimal. More accuracy and less redundant information could be obtained by entering the melodic themes for particular songs by keyboard.

The resolution of the relative pitch differences may be desirably increased by using query alphabets of three, five, and more possible relationships between adjacent pitches. Early experiments using an alphabet of five relative pitch differences (same, higher, much higher, lower, much lower) indicated changes of this sort are promising. One drawback of introducing more resolution is that the users must be somewhat more accurate in the intervals they actually hum.

It should be understood that, while the present invention has been described in detail herein, the invention can be embodied otherwise without departing from the principles thereof, and such other embodiments are meant to come within the scope of the present invention as defined by the appended claims.

What is claimed is:

1. Apparatus for searching a melody comprising a computer means having a database of melodies each including a plurality of notes in a form of a sequence of digitized representations of relative pitch differences between successive notes, means for inputting a melody to said computer means, means for converting the melody into a form of a sequence of digitized representations of relative pitch differences between successive notes thereof, and means for searching said melody database for at least one sequence of digitized representations of relative pitch differences between successive notes which at least approximately matches said sequence of digitized representations of relative pitch differences between successive notes of the melody.

2. Apparatus according to claim 1 wherein said input means comprises a microphone.

3. Apparatus according to claim 1 further comprising means for outputting from said computer a ranked list of approximately matching melodies.

4. Apparatus according to claim 1 wherein said converting means comprises an autocorrelation based pitch detector means.

5. Apparatus according to claim 1 wherein said converting means comprises an autocorrelation based pitch detector means having low-pass filter means for removing non-vocal frequencies and center-clipping means for eliminating unwanted formant structure.

6. Apparatus according to claim 1 wherein said converting means comprises a wavelet pitch tracker.

7. Apparatus according to claim 1 wherein said converting means comprises a cubic spline wavelet pitch tracker.

8. Apparatus according to claim 1 further comprising means for approximately matching sequences of digitized representations of relative pitch differences between successive notes.

9. A method for searching a melody comprising the steps of: (a) selecting a computer means having a database of melodies each including a plurality of notes in a form of a sequence of digitized representations of relative pitch differences between successive notes, (b) inputting a melody to the computer means, (c) converting the melody into a form of a sequence of digitized representations of relative pitch differences between successive notes thereof, and (d) searching the melody database for at least one sequence of digitized representations of relative pitch differences between successive notes which at least approximately matches the sequence of digitized representations of relative pitch differences between successive notes of the melody.

10. A method according to claim 9 wherein the step of inputting the melody comprises humming into a microphone.

11. A method according to claim 9 further comprising operating the computer to output a ranked list of approximately matching melodies.

12. A method according to claim 9 wherein the step of converting comprises applying to the sequence of representations of relative pitch changes between successive notes of the hummed melody an autocorrelation based pitch detector.

13. A method according to claim 9 wherein the step of converting comprises applying to the sequence of representations of relative pitch changes between successive notes of the hummed melody an autocorrelation based pitch detector having low pass filtering for removing non-vocal frequencies and center-clipping for eliminating unwanted formant structure.

14. A method according to claim 9 wherein the step of converting comprises applying to the sequence of representations of relative pitch changes between successive notes of the hummed melody a wavelet pitch tracker.

15. A method according to claim 9 wherein the step of converting comprises applying to the sequence of representations of relative pitch changes between successive notes of the hummed melody a cubic spline wavelet pitch tracker.

16. A method according to claim 9 further comprising operating the computer means to obtain approximate matches of sequences of digitized representations of relative pitch differences between successive notes.

* * * * *